United States Patent
Chu et al.

(10) Patent No.: US 12,476,293 B2
(45) Date of Patent: Nov. 18, 2025

(54) MOISTURE RELEASING METAL-HYDROXIDE MATERIAL FOR MITIGATION OF THERMAL RUNAWAY IN A BATTERY MODULE

(71) Applicant: GM GLOBAL TECHNOLOGY OPERATIONS LLC, Detroit, MI (US)

(72) Inventors: Seung-Woo Chu, Clawson, MI (US); Scott W. Lananna, Detroit, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 665 days.

(21) Appl. No.: 17/951,264

(22) Filed: Sep. 23, 2022

(65) Prior Publication Data

US 2024/0106021 A1   Mar. 28, 2024

(51) Int. Cl.
| | |
|---|---|
| *H01M 10/613* | (2014.01) |
| *H01M 10/653* | (2014.01) |
| *H01M 10/6556* | (2014.01) |
| *H01M 10/6595* | (2014.01) |

(52) U.S. Cl.
CPC ....... *H01M 10/613* (2015.04); *H01M 10/653* (2015.04); *H01M 10/6556* (2015.04); *H01M 10/6595* (2015.04)

(58) Field of Classification Search
CPC ............. H01M 10/613; H01M 10/653; H01M 10/6556; H01M 10/6595
See application file for complete search history.

(56) References Cited

U.S. PATENT DOCUMENTS

| | | | |
|---|---|---|---|
| 2018/0175468 A1* | 6/2018 | Shin ................ | H01M 10/6556 |
| 2022/0021046 A1* | 1/2022 | Shi ................... | H01M 50/124 |
| 2022/0037720 A1* | 2/2022 | Yang ................ | H01M 10/6595 |
| 2024/0088484 A1* | 3/2024 | Ando ............... | H01M 10/658 |

FOREIGN PATENT DOCUMENTS

| | | |
|---|---|---|
| DE | 102019121849 A1 | 2/2021 |
| DE | 102022120234 A1 | 3/2023 |

* cited by examiner

*Primary Examiner* — James Lee
(74) *Attorney, Agent, or Firm* — Quinn IP Law

(57) ABSTRACT

A battery module includes neighboring first and second battery cells and a heat sink in contact with and configured to absorb thermal energy from each of the battery cells. The module additionally includes a module enclosure surrounded by ambient environment, housing each of the first and second battery cells and the heat sink, and configured to include a thermal conductivity path from the first cell to at least one of the second cell and the heat sink and from the heat sink to the enclosure. The battery module further includes a metal-hydroxide element configured to undergo a chemical decomposition and discharge moisture within the thermal conductivity path in response to thermal energy released by the first cell when the first cell undergoes a thermal runaway event. The metal-hydroxide element thereby controls propagation of the thermal runaway event from the first cell to the second cell.

16 Claims, 5 Drawing Sheets

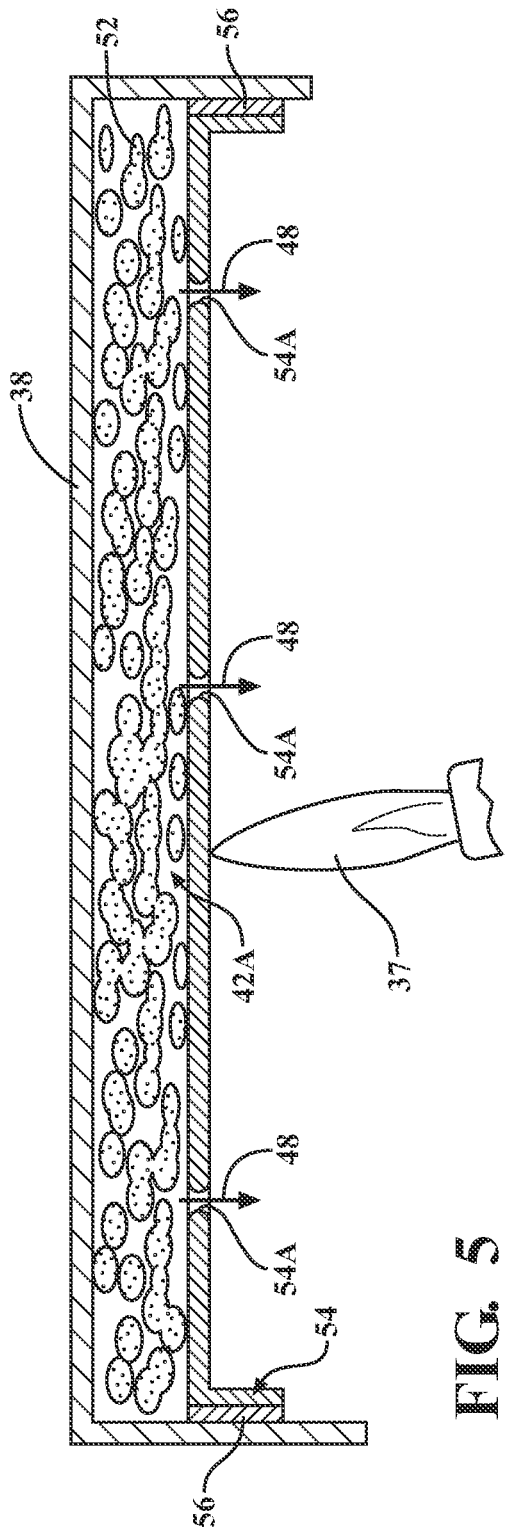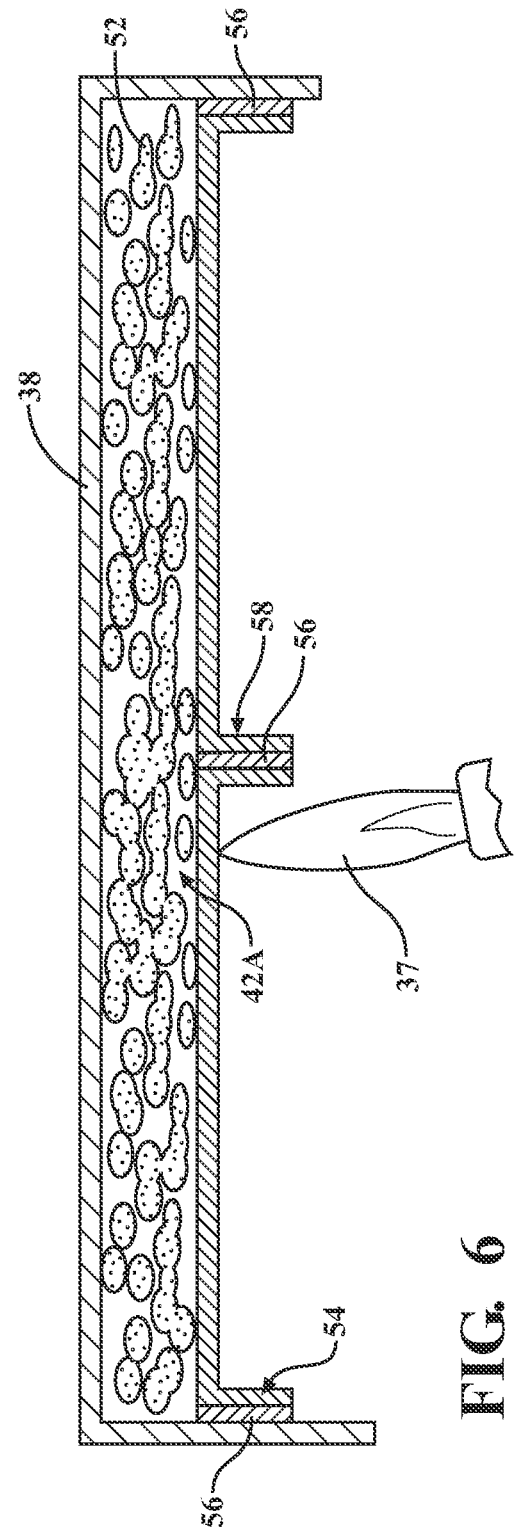

MOISTURE RELEASING METAL-HYDROXIDE MATERIAL FOR MITIGATION OF THERMAL RUNAWAY IN A BATTERY MODULE

INTRODUCTION

The present disclosure relates to heat removal and thermal runaway event mitigation in a battery module via a moisture releasing metal-hydroxide material.

A battery module or array may include a plurality of battery cells in relatively close proximity to one another. Batteries may be broadly classified into primary and secondary batteries. Primary batteries, also referred to as disposable batteries, are intended to be used until depleted, after which they are simply replaced with new batteries. Secondary batteries, more commonly referred to as rechargeable batteries, employ specific chemistries permitting such batteries to be repeatedly recharged and reused, therefore offering economic, environmental and ease-of-use benefits compared to disposable batteries.

Rechargeable batteries may be used to power such diverse items as toys, consumer electronics, and motor vehicles. Particular chemistries of rechargeable batteries, such as lithium-ion cells, as well as external factors, may cause internal reaction rates generating significant amounts of thermal energy. Such chemical reactions may cause more heat to be generated by the batteries than is effectively withdrawn. Exposure of a battery cell to elevated temperatures over prolonged periods may cause the cell to experience a thermal runaway event. Accordingly, a thermal runaway event starting within an individual cell may lead to the heat spreading to adjacent cells in the module and cause the thermal runaway event to affect the entire battery array.

SUMMARY

A battery module includes a first battery cell and a neighboring second battery cell. The battery module also includes a heat sink in contact with and configured to absorb thermal energy from each of the first battery cell and the second battery cell. The battery module additionally includes a battery module enclosure surrounded by ambient environment, housing each of the first battery cell, the second battery cell, and the heat sink, and configured to include a thermal conductivity path from the first battery cell to at least one of the second battery cell and the heat sink and from the heat sink to the battery module enclosure. The battery module further includes a metal-hydroxide element configured to undergo a chemical decomposition and discharge moisture within the thermal conductivity path in response to thermal energy released by the first battery cell when a temperature of the first battery cell exceeds a predetermined value indicative of a thermal runaway event. The metal-hydroxide element thereby controls propagation of the thermal runaway event from the first battery cell to the second battery cell.

At least a portion of the thermal conductivity path may include a spatial gap between adjacent battery module components. In such an embodiment, the metal-hydroxide element may be arranged within the spatial gap.

The portion of the thermal conductivity path having the spatial gap may extend between the first and second battery cells. In such an embodiment, the metal-hydroxide element may be arranged in the spatial gap of the portion of the thermal conductivity path extending between the first and second battery cells.

The battery module further may additionally include a wire-tap connection extending through the battery module enclosure. In such an embodiment, the portion of the thermal conductivity path having the spatial gap may extend proximate the wire-tap connection, and the metal-hydroxide element may be arranged in the spatial gap of the portion of the thermal conductivity path extending proximate the wire-tap connection.

The spatial gap may be located between at least a section of the heat sink and the battery module enclosure.

The metal-hydroxide element may be a pre-formed tablet matching a shape of the spatial gap.

The metal-hydroxide element may be a pre-formed sheet arranged along at least a portion of the thermal conductivity path.

The metal-hydroxide element may include a loose or a compacted metal-hydroxide powder. The metal hydroxide powder may be magnesium hydroxide [$Mg(OH)_2$] or aluminum hydroxide [$Al(OH)_3$].

The metal-hydroxide element may be arranged inside a container configured to disintegrate when the temperature of the first battery cell exceeds the predetermined value.

The container may be mounted to the battery module enclosure via an adhesive.

The container may include multiple sections joined or attached to each other via an adhesive.

A motor vehicle having a power-source and the above-disclosed battery module configured to supply electric energy to the power-source is also disclosed.

The above features and advantages, and other features and advantages of the present disclosure, will be readily apparent from the following detailed description of the embodiment (s) and best mode(s) for carrying out the described disclosure when taken in connection with the accompanying drawings and appended claims.

BRIEF DESCRIPTION OF THE DRAWINGS

FIG. 5 is a schematic close-up cross-sectional view of an embodiment of a container holding metal-hydroxide powder and mounted to the battery module enclosure, according to the disclosure.

FIG. 6 is a schematic close-up cross-sectional view of another embodiment of the container shown in FIG. 5, according to the disclosure.

DETAILED DESCRIPTION

Those having ordinary skill in the art will recognize that terms such as "above", "below", "upward", "downward", "top", "bottom", "left", "right", etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of a number of hardware, software, and/or firmware components configured to perform the specified functions.

Figure 1:
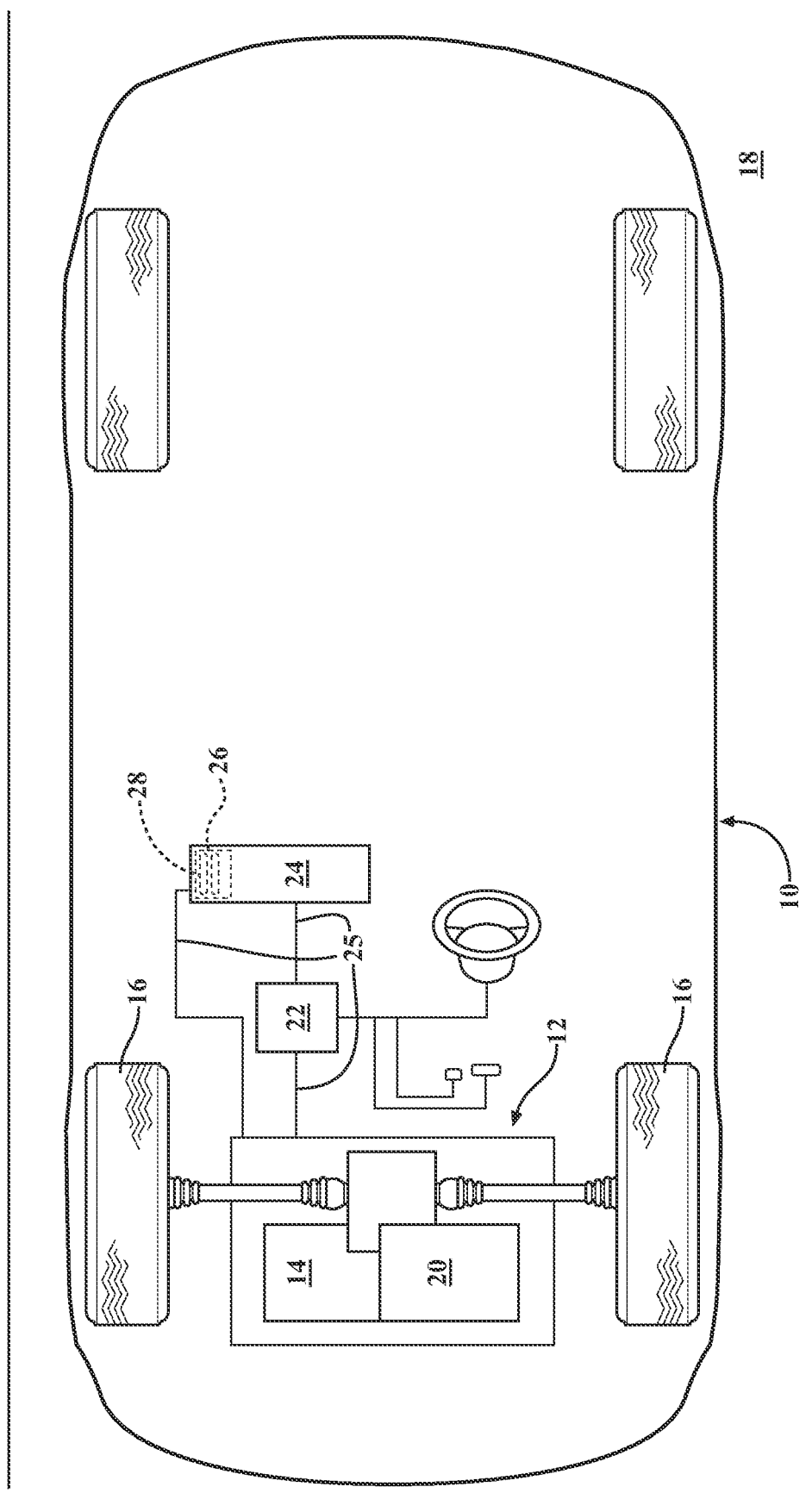
FIG. 1 is a schematic top view of an embodiment of a motor vehicle employing multiple power-sources and a battery system having a battery module configured to generate and store electrical energy, according to the disclosure.

Referring to FIG. 1, a motor vehicle 10 having a powertrain 12 is depicted. The vehicle 10 may include, but not be limited to, a commercial vehicle, industrial vehicle, passenger vehicle, aircraft, watercraft, train or the like. It is also contemplated that the vehicle 10 may be a mobile platform, such as an airplane, all-terrain vehicle (ATV), boat, personal movement apparatus, robot and the like to accomplish the purposes of this disclosure. The powertrain 12 includes a power-source 14 configured to generate a power-source torque T (shown in FIG. 1) for propulsion of the vehicle 10 via driven wheels 16 relative to a road surface 18. The power-source 14 is depicted as an electric motor-generator.

As shown in FIG. 1, the powertrain 12 may also include an additional power-source 20, such as an internal combustion engine. The power-sources 14 and 20 may act in concert to power the vehicle 10. The vehicle 10 additionally includes an electronic controller 22 and a battery system 24 configured to generate and store electrical energy through heat-producing electro-chemical reactions for supplying the electrical energy to the power-sources 14 and 20. The electronic controller 22 may be a central processing unit that regulates various functions on the vehicle 10, or as a powertrain control module configured to control the powertrain 12 to generate a predetermined amount of power-source torque T. The battery system 24 may be connected to the power-sources 14 and 20, the electronic controller 22, as well as other vehicle systems, via an electrical system 25, for example having a high-voltage BUS.

As shown in FIGS. 1-5, the battery system 24 may include one or more sections, such as a battery array or module 26, which may be organized into battery pack(s). As shown in FIG. 1, the battery module 26 includes a plurality of battery cells 28, such as a first battery cell 28-1 and a neighboring, directly adjacent, second battery cell 28-2 (shown in FIG. 2). Although one module 26 and two battery cells 28-1, 28-2 are shown, nothing precludes the battery system 24 from having a greater number of such modules and battery cells. The battery module 26 also includes an insulating member or pad 30 arranged between the first battery cell 28-1 and the second battery cell 28-2. The insulating member 30 may be constructed from a high-temperature polymer foam configured to limit the amount of thermal energy transfer between the neighboring battery cells 28-1, 28-2. The insulating member 30 is also configured to maintain consistent and uniform contact with the first cell 28-1 and the second cell 28-2 during alternate expansion of the subject cells when charging and contraction of the cells when discharging.

Figure 2:
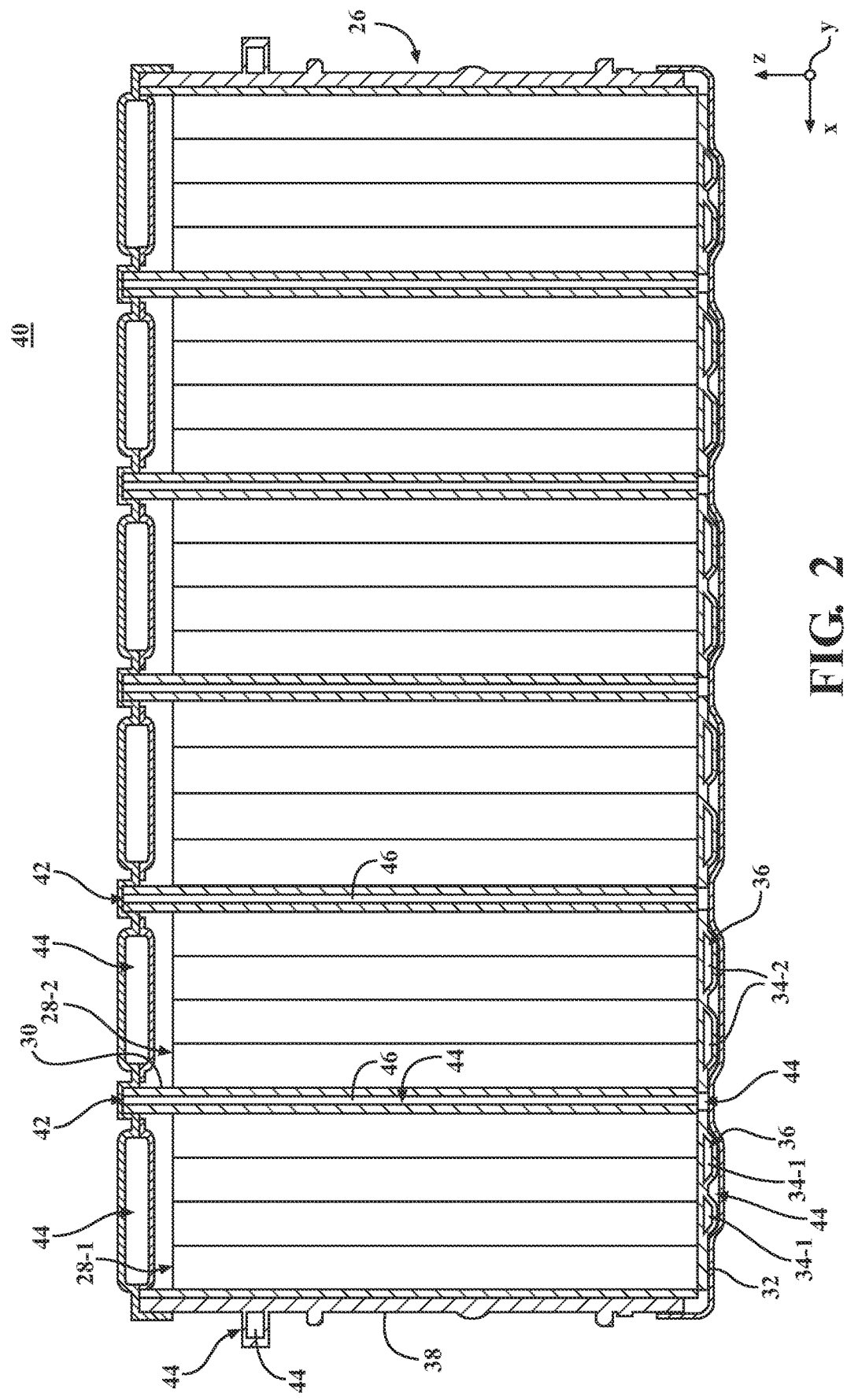
FIG. 2 is a schematic cross-sectional plan view of the battery module shown in FIG. 1, having a battery module enclosure including a thermal conductivity path, a heat sink, and a general representation of a metal-hydroxide element configured to discharge moisture between adjacent battery module components to mitigate thermal runaway in the battery module, according to the disclosure.

As shown in FIGS. 2-10, the battery module 26 also includes a heat sink 32. The heat sink 32 is adjacent to each of the first battery cell 28-1 and the second battery cell 28-2 and thereby configured to absorb thermal energy from the first and second battery cells. As shown, the heat sink 32 may be in direct physical contact with the first and second battery cells 28-1, 28-2. The heat sink 32 may be configured as a coolant plate having a plurality of coolant channels, shown as respective first and second coolant channels 34-1 and 34-2 in FIGS. 3-8. The coolant channels 34-1, 34-2 are specifically configured to circulate a coolant 36 and thereby remove thermal energy from the first and second battery cells 28-1, 28-2 while the battery module 26 generates/stores electrical energy. As shown in FIG. 2, the first coolant channel 34-1 may be arranged proximate (generally, either above or below) the first battery cell 28-1 and the second coolant channel 34-2 may be arranged proximate the second battery cell 28-2.

Generally, during normal operation of the module 26, the insulating member 30 is effective in blocking transfer of released thermal energy between the first and second battery cells 28-1 28-2 and facilitating transfer of the thermal energy to the heat sink 32. However, during extreme conditions, such as during a thermal runaway event (identified via numeral 37 in FIG. 4), the amount of thermal energy released by the cell undergoing the event will typically saturate the insulating member 30 and exceed its capacity to absorb and efficiently transfer heat to the heat sink 32. As a result, excess thermal energy will typically be transferred between the neighboring cells 28-1, 28-2, leading to propagation of the thermal runaway through the module 26. The term "thermal runaway event" generally refers to an uncontrolled increase in temperature in a battery system. During a thermal runaway event, the generation of heat within a battery system or a battery cell exceeds the dissipation of heat, thus leading to a further increase in temperature. A thermal runaway event may be triggered by various conditions, including a short circuit within the cell, improper cell use, physical abuse, manufacturing defects, or exposure of the cell to extreme external temperatures.

As shown in FIG. 2, the battery module 26 also includes a battery module enclosure 38 surrounded by ambient environment 40 and configured to house each of the battery cells 28 and the heat sink 32. The battery module 26 includes a thermal conductivity or heat transfer path 42 encased by the battery module enclosure 38, which extends from inside the module and among battery module components to the ambient environment 40. The thermal conductivity path 42 includes the battery cells 28, such as the first and second battery cells 28-1, 28-2, and extends through the interior of the battery module 26 to the heat sink 32 and from the heat sink to the battery module enclosure 38. One or more portions 42A (for example, shown in FIG. 3) of the thermal conductivity path 42 may include individual spatial gaps 44 between adjacent battery module components, such as between the battery cells, between one of the battery cells 28 and the heat sink 32, etc.

With reference to FIGS. 2-6, the battery module 26 also includes one or more metal-hydroxide elements 46 arranged within the thermal conductivity path 42. When subjected to extreme heat, metal-hydroxide chemically breaks down into metal oxide and water. Accordingly, as employed in the battery module 26, each metal-hydroxide element 46 is configured to undergo a chemical decomposition and discharge moisture 48, i.e., water, within the thermal conductivity path 42 in response to significant thermal energy being released within the module. Specific embodiments of the metal-hydroxide elements 46 may be arranged on the sides of individual battery cells 28, such as along the insulating members 30, and/or above or below individual battery cells 28 (shown in FIGS. 2-6).

Each metal-hydroxide element 46 is intended to undergo the above transformation and discharge moisture 48 (shown in FIGS. 4 and 5) in response to a significant amount of thermal energy being released by one of the battery cells 28, such as the first battery cell 28-1. Such an amount of released thermal energy generally correlates to a temperature of the first battery cell 28-1 exceeding a predetermined value $t_c$, itself indicative of the subject battery cell experiencing a thermal runaway event 37. Specifically, the predetermined value $t_c$ may be 200 degrees Celsius. The discharged moisture 48 is intended to remove thermal energy from the surface of nearby components, such as battery cells 28, via evaporation. Such discharge of the moisture 48 by the metal-hydroxide element 46 is thereby configured to control propagation of the thermal runaway event to neighboring battery cells, such as the second battery cell 28-2.

Figure 3:
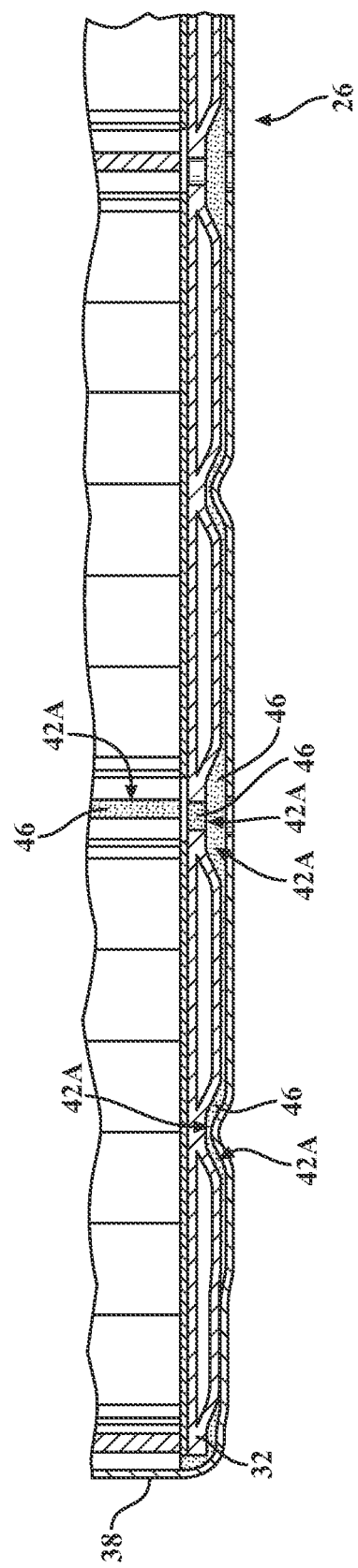
FIG. 3 is a schematic close-up cross-sectional partial plan view of a portion of the battery module shown in FIG. 2, depicting embodiments of the metal-hydroxide element arranged inside particular spatial gaps within a thermal conductivity path in the battery module, according to the disclosure.
Figure 4:
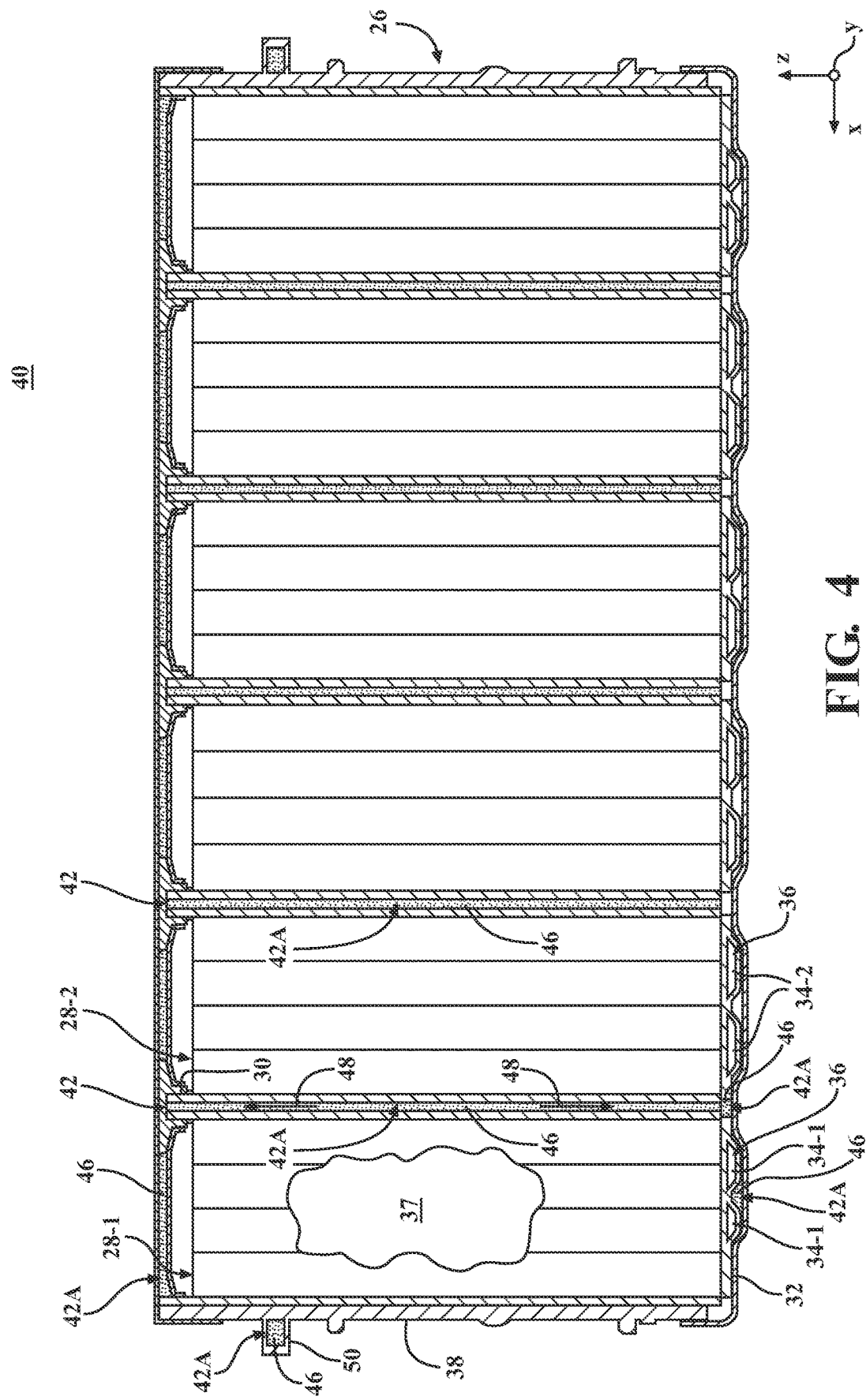
FIG. 4 is a schematic cross-sectional partial plan view of the battery module shown in FIG. 2, wherein an embodiment of the metal-hydroxide element is depicted discharging moisture in response to a thermal runaway event in the battery module, according to the disclosure.

Although each of the battery cells 28 may go into thermal runaway, the present disclosure will primarily focus on the thermal runaway event commencing in the first battery cell 28-1. In such an embodiment, the specific metal-hydroxide element 46 is arranged proximate the first battery cell 28-1 and configured to release moisture during exposure to elevated levels of thermal energy. Accordingly, the subject metal-hydroxide element 46 is configured to introduce moisture 48 into the thermal conductivity path 42 in response to a significant temperature increase in the first battery cell 28-1. As shown in FIGS. 2-4, the metal-hydroxide element 46 may thus be arranged within a particular spatial gap 44 proximate the first battery cell 28-1.

The metal-hydroxide element 46 may be a pre-formed tablet specifically molded to match the shape of a particular spatial gap 44 in a specific portion of the thermal conductivity path 42 (shown in FIG. 3). Alternatively, as shown in FIGS. 2 and 4, the metal-hydroxide element 46 may be a pre-formed sheet, such as sandwiched between the first and second battery cells 28-1, 28-2, arranged along at least a portion of the thermal conductivity path 42. Accordingly, and as noted above, a specific portion 42A of the thermal conductivity path 42 having the spatial gap 44 may extend between the first and second battery cells 28-1. 28-2. The metal-hydroxide element 46 may then be arranged in the particular spatial gap 44 of the portion of the thermal conductivity path 42 extending between the first and second battery cells 28-1. 28-2. In such an embodiment, the pre-formed sheet of the metal-hydroxide element 46 may then be positioned within a particular spatial gap 44 between the first and second battery cells 28-1, 28-2.

As shown in FIGS. 2 and 4, the battery module 26 may additionally include a wire-tap connection 50 extending through the battery module enclosure 38. The portion 42A of the thermal conductivity path 42 having a specific spatial gap 44 may extend proximate the wire-tap connection 50. In such an embodiment, the metal-hydroxide element 46 may be arranged in the particular spatial gap 44 of the portion of the thermal conductivity path 42 extending proximate the wire-tap connection 50. Additionally, as shown in FIG. 3, a specific spatial gap 44 may be located between a section of the heat sink 32 and the battery module enclosure 38. The metal-hydroxide element 46 may be in a compacted or powdered form. While the rate of response to thermal energy may be more rapid with the powdered metal-hydroxide, in either form, the metal-hydroxide element 46 is intended to absorb thermal energy above the predetermined temperature value $t_c$ and generate the water byproduct.

In nonlimiting examples, the powder particles 52 in either compacted or powder form may be magnesium hydroxide [$Mg(OH)_2$] or aluminum hydroxide [$Al(OH)_3$]. The metal-hydroxide element 46 may have specifically sized powder particles 52 arranged inside the container 54. As shown in FIG. 5, the battery module 26 may additionally include a container 54 configured to disintegrate at extreme temperatures. The container 54 may define openings 54A sized smaller than the powder particles 52 to permit more effective transfer of thermal energy to the powder particles 52. In turn, enhanced thermal energy transfer will elicit quicker response via spread of the powder particles 52 and generation of moisture 48 within the thermal conductivity path 42 and the interior of the battery module enclosure 38 upon advent of the thermal runaway event 37. In powdered form, to efficiently absorb thermal energy, the metal hydroxide particles 52 may have a minimum specific surface area of 1.0 $m^2/g$. In pre-shaped or compacted form, the metal-hydroxide element 46 may include starch (as a bonding agent) blended with the metal hydroxide particles 52 at 1-10% of total mass to promote dimensional stability of the metal-hydroxide element. To further enhance mechanical strength of the metal-hydroxide element 46, the metal-hydroxide element may include an alternative bonding agent, such as a resin (e.g., silicon based), at 1-10% of total element mass.

As noted, the structure of the container 54 may be specifically selected to lose its integrity above the predetermined temperature value $t_c$. In other words, the container 54 may be configured to disintegrate, e.g., melt or otherwise come apart, when the first battery cell 28-1 goes into thermal runaway and the cell's temperature exceeds the aforementioned predetermined value $t_c$. For example, the container 54 may be constructed from aluminum configured to melt above the predetermined temperature value $t_c$. The container 54 structure may include multiple sections with multiple bonding interfaces therebetween using polymeric adhesives. Such a container 54 structure may be configured to spray or disperse metal-hydroxide element 46 powder in a nearby area, whether the thermal event initiates in a battery cell in the same battery module 26 or in a larger battery pack.

The container 54 may be mounted to the battery module enclosure 38, for example proximate the heat sink 32, via an adhesive 56, as shown in FIG. 5. Additionally, the container 54 may be split into multiple sections joined or attached to each other in respective seam(s) 58 via the adhesive 56 (shown in FIG. 6). The specific number of container 54 sections and seams 58 may be selected depending on the size and shape of the container and its arrangement relative to the thermal conductivity path 42. The adhesive 56 applied between individual sections of the container 54 and/or between the container and the battery module enclosure 38 may be purposely selected to maintain its grip up to the predetermined temperature value $t_c$.

Overall, the metal-hydroxide elements 46 arranged inside the thermal conductivity path 42 are configured to automatically respond to a battery cell 28 in a battery module 26 having reached a predetermined temperature during a thermal runaway by absorbing some of the excess thermal energy. The absorption of excess thermal energy from the battery cell 28 in thermal runaway by the metal-hydroxide element(s) 46 also permits the heat sink 32 operate more effectively and use the circulating fluid therein to transfer the remaining thermal energy out of the battery module 26. The metal-hydroxide element(s) 46 may be used in preformed/compacted or powdered form and are intended to discharge moisture 48 into the thermal conductivity path 42 between the battery module enclosure 38 and the subject battery cell during a thermal runaway.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A battery module comprising:
   a first battery cell and a neighboring second battery cell, wherein each battery cell is defined by a respective battery cell width and a battery cell length;
   a heat sink in contact with each of the first battery cell and the second battery cell and configured to absorb thermal energy from the first and second battery cells;
   a battery module enclosure surrounded by ambient environment, housing each of the first battery cell, the second battery cell, and the heat sink, and configured to include a thermal conductivity path from the first battery cell to at least one of the second battery cell and the heat sink and from the heat sink to the battery module enclosure; and
   one or more metal-hydroxide elements configured to undergo a chemical decomposition and discharge moisture within the thermal conductivity path in response to thermal energy released by the first battery cell when a temperature of the first battery cell exceeds a predetermined value indicative of a thermal runaway event and thereby control propagation of the thermal runaway event to the second battery cell;
   wherein:
      at least a portion of the thermal conductivity path includes a spatial gap between adjacent battery module components, and wherein the metal-hydroxide element is arranged within the spatial gap;
      the portion of the thermal conductivity path having the spatial gap extends between the first and second battery cells along the respective battery cell lengths; and
      one of the metal-hydroxide elements is arranged in the spatial gap of the portion of the thermal conductivity path extending between the first and second battery cells along the respective battery cell lengths.

2. The battery module of claim 1, further comprising a wire-tap connection extending through the battery module enclosure, wherein the portion of the thermal conductivity path having the spatial gap extends proximate the wire-tap connection, and wherein one of the metal-hydroxide elements is arranged in the spatial gap of the portion of the thermal conductivity path extending proximate the wire-tap connection.

3. The battery module of claim 1, wherein the spatial gap is located between at least a section of the heat sink and the battery module enclosure.

4. The battery module of claim 1, wherein at least one of the metal-hydroxide elements is a pre-formed tablet matching a shape of the spatial gap.

5. The battery module of claim 1, wherein at least one of the metal-hydroxide elements is a pre-formed sheet arranged along at least a portion of the thermal conductivity path.

6. The battery module of claim 1, wherein at least one of the metal-hydroxide elements includes a metal-hydroxide powder.

7. The battery module of claim 6, further comprising a container configured to disintegrate when the temperature of the first battery cell exceeds the predetermined value, and wherein the metal-hydroxide powder is arranged inside the container.

8. The battery module of claim 7, wherein:
   the container includes multiple sections; and
   the container is mounted to the battery module enclosure and multiple sections are joined, each via an adhesive.

9. A motor vehicle comprising:
   a power-source configured to generate power-source torque; and
   a battery module configured to supply electrical energy to the power-source, the battery module including:
   a first battery cell and a neighboring second battery cell, wherein each battery cell is defined by a respective battery cell width and a battery cell length;
   a heat sink in contact with each of the first battery cell and the second battery cell and configured to absorb thermal energy from the first and second battery cells;
   a battery module enclosure surrounded by ambient environment, housing each of the first battery cell, the second battery cell, and the heat sink, and configured to include a thermal conductivity path from the first battery cell to at least one of the second battery cell and the heat sink and from the heat sink to the battery module enclosure; and
   one or more metal-hydroxide elements configured to undergo a chemical decomposition and discharge moisture within the thermal conductivity path in response to thermal energy released by the first battery cell when a temperature of the first battery cell exceeds a predetermined value indicative of a thermal runaway event and thereby control propagation of the thermal runaway event to the second battery cell;
   wherein:
      at least a portion of the thermal conductivity path includes a spatial gap between adjacent battery module components, and wherein the metal-hydroxide element is arranged within the spatial gap;
      the portion of the thermal conductivity path having the spatial gap extends between the first and second battery cells along the respective battery cell lengths; and
      one of the metal-hydroxide elements is arranged in the spatial gap of the portion of the thermal conductivity path extending between the first and second battery cells along the respective battery cell lengths.

10. The motor vehicle of claim 9, wherein the battery module additionally includes a wire-tap connection extending through the battery module enclosure, wherein the portion of the thermal conductivity path having the spatial gap extends proximate the wire-tap connection, and wherein at least one of the metal-hydroxide elements is arranged in the spatial gap of the portion of the thermal conductivity path extending proximate the wire-tap connection.

11. The motor vehicle of claim 9, wherein the spatial gap is located between at least a section of the heat sink and the battery module enclosure.

12. The motor vehicle of claim 9, wherein at least one of the metal-hydroxide elements is a pre-formed tablet matching a shape of the spatial gap.

13. The motor vehicle of claim 9, wherein at least one of the metal-hydroxide elements is a pre-formed sheet arranged along at least a portion of the thermal conductivity path.

14. The motor vehicle of claim 9, wherein at least one of the metal-hydroxide elements includes a metal hydroxide powder.

15. The motor vehicle of claim 14, wherein:
the battery module additionally includes a container configured to disintegrate when the temperature of the first battery cell exceeds the predetermined value;
the metal-hydroxide powder is arranged inside the container; and
the container is mounted to the battery module enclosure via an adhesive.

16. A battery module comprising:
a first battery cell and a neighboring second battery cell, wherein each battery cell is defined by a respective battery cell width and a battery cell length;
a heat sink in contact with each of the first battery cell and the second battery cell and configured to absorb thermal energy from the first and second battery cells;
a battery module enclosure surrounded by ambient environment, housing each of the first battery cell, the second battery cell, and the heat sink, and configured to include a thermal conductivity path from the first battery cell to at least one of the second battery cell and the heat sink and from the heat sink to the battery module enclosure, wherein at least a portion of the thermal conductivity path includes a spatial gap adjacent at least one of the first battery cell, the second battery cell, the heat sink, and the battery module enclosure; and
one or more metal-hydroxide elements arranged within the spatial gap and configured to undergo a chemical decomposition and discharge moisture within the thermal conductivity path in response to thermal energy released by the first battery cell when a temperature of the first battery cell exceeds a predetermined value indicative of a thermal runaway event and thereby control propagation of the thermal runaway event to the second battery cell;
wherein at least a portion of the spatial gap extends between the first and second battery cells along the respective battery cell lengths and one of the metal-hydroxide elements is arranged therein.

\* \* \* \* \*